United States Patent
Zhang

(10) Patent No.: US 8,498,983 B1
(45) Date of Patent: Jul. 30, 2013

(54) ASSISTING SEARCH WITH SEMANTIC CONTEXT AND AUTOMATED SEARCH OPTIONS

(76) Inventor: Guangsheng Zhang, Palo Alto, CA (US)

( * ) Notice: Subject to any disclaimer, the term of this patent is extended or adjusted under 35 U.S.C. 154(b) by 0 days.

(21) Appl. No.: 13/241,534

(22) Filed: Sep. 23, 2011

Related U.S. Application Data

(63) Continuation-in-part of application No. 12/972,462, filed on Dec. 18, 2010, now Pat. No. 8,407,217.

(60) Provisional application No. 61/387,005, filed on Sep. 28, 2010, provisional application No. 61/299,823, filed on Jan. 29, 2010, provisional application No. 61/306,523, filed on Feb. 21, 2010, provisional application No. 61/306,524, filed on Feb. 21, 2010.

(51) Int. Cl.
*G06F 17/30* (2006.01)

(52) U.S. Cl.
USPC ........... 707/731; 707/706; 707/722; 707/736; 706/12; 706/14

(58) Field of Classification Search
None
See application file for complete search history.

(56) References Cited

U.S. PATENT DOCUMENTS

| | | | |
|---|---|---|---|
| 5,930,788 A | 7/1999 | Wical | |
| 6,070,158 A * | 5/2000 | Kirsch et al. | 1/1 |
| 6,101,515 A | 8/2000 | Wical | |
| 6,208,988 B1 * | 3/2001 | Schultz | 1/1 |
| 6,487,545 B1 | 11/2002 | Wical | |
| 6,651,058 B1 * | 11/2003 | Sundaresan et al. | 1/1 |
| 6,775,677 B1 * | 8/2004 | Ando et al. | 707/739 |
| 6,947,930 B2 * | 9/2005 | Anick et al. | 1/1 |
| 7,769,752 B1 * | 8/2010 | Turner et al. | 707/731 |
| 7,890,526 B1 * | 2/2011 | Brewer et al. | 707/767 |
| 2004/0133564 A1 * | 7/2004 | Gross et al. | 707/3 |
| 2006/0106769 A1 * | 5/2006 | Gibbs | 707/3 |
| 2007/0050351 A1 * | 3/2007 | Kasperski et al. | 707/4 |
| 2007/0143262 A1 * | 6/2007 | Kasperski | 707/3 |
| 2008/0016034 A1 * | 1/2008 | Guha et al. | 707/3 |
| 2008/0222140 A1 * | 9/2008 | Lagad et al. | 707/5 |
| 2009/0234811 A1 * | 9/2009 | Jamil et al. | 707/3 |
| 2010/0299358 A1 * | 11/2010 | Venkataraman et al. | 707/769 |
| 2011/0047120 A1 * | 2/2011 | Kamvar et al. | 706/50 |
| 2012/0011110 A1 * | 1/2012 | Mehanna et al. | 707/722 |
| 2012/0131033 A1 * | 5/2012 | Bierner | 707/767 |
| 2012/0136847 A1 * | 5/2012 | Venkataraman et al. | 707/706 |

* cited by examiner

*Primary Examiner* — Hung Le
(74) *Attorney, Agent, or Firm* — SV Patent Service

(57) ABSTRACT

A computer-assisted method for assisting a user to search for documents or other file objects includes receiving a query comprising a queried term from a user, wherein the queried term comprises a sequence of characters entered by the user, obtaining a first context term list comprising a first context term semantically related to the queried term, obtaining and displaying a first search result, dynamically displaying the first context term list in response to each character being entered in the query, allowing the user to select the first context term in the first context term list, obtaining a second context term list comprising a second context term semantically related to the queried term and the first context term, and displaying a second search result and the second context term list in a user interface in response to the selection of the first context term in the first context term list.

19 Claims, 10 Drawing Sheets

Object name: Computer

| Property Names | Object-dependent Association Strength |
|---|---|
| CPU | 0.99 |
| motherboard | 0.90 |
| memory | 0.95 |
| hard disk | 0.80 |
| operating system | 0.98 |
| speed | 0.60 |
| multi-media | 0.50 |
| case | 0.2 |
| software | 0.7 |
| color | 0.2 |
| UNIX | 0.5 |
| Microsoft | 0.8 |
| …… | …… |

Figure 1

| Term | External Term Prominence | | | |
|---|---|---|---|---|
| | With parser | Without parser | Paragraph | Document |
| computer | 0.002 | 0.0003 | 0.05 | 0.0004 |
| CUP | 0.001 | 0.0004 | 0.002 | 0.0002 |
| memory | 0.004 | 0.0006 | 0.054 | 0.0003 |
| Hard disk | 0.006 | 0.0003 | 0.056 | 0.0004 |
| software | 0.002 | 0.0003 | 0.058 | 0.0006 |
| ...... | | | | |

Figure 4A: external data table

| Term | External Term Prominence for different grammatical roles in terms of token types | | | | | | | | | |
|---|---|---|---|---|---|---|---|---|---|---|
| | Type 1 | Type 2 | Type 3 | Type 4 | Type 5 | Type 6 | Type 7 | Type 8 | Other 1 | Other 2 |
| computer | 0.002 | 0.0003 | 0.05 | 0.0004 | 0.03 | 0.09 | 0.001 | 0.03 | 0.21 | 0.05 |
| CUP | 0.001 | 0.0004 | 0.002 | 0.0002 | 0.03 | 0.099 | 0.001 | 0.03 | 0.14 | 0.009 |
| memory | 0.004 | 0.0006 | 0.054 | 0.0003 | 0.03 | 0.093 | 0.001 | 0.03 | 0.05 | 0.0045 |
| Hard disk | 0.006 | 0.0003 | 0.056 | 0.0004 | 0.03 | 0.095 | 0.001 | 0.03 | 0.07 | 0.222 |
| software | 0.002 | 0.0003 | 0.058 | 0.0006 | 0.03 | 0.096 | 0.001 | 0.03 | 0.08 | 0.021 |
| ...... | | | | | | | | | | |

Figure 4B: external data table with values for different token types

ASSISTING SEARCH WITH SEMANTIC CONTEXT AND AUTOMATED SEARCH OPTIONS

CROSS REFERENCES TO RELATED APPLICATIONS

The present application is a continuation-in-part application of and claims priority to U.S. patent application Ser. No. 12,972,462, titled "Automated topic discovery in documents", filed by the present inventor on Dec. 18, 2010 now U.S. Pat. No. 8,407,217. The present application also claims priority to U.S. Provisional Patent Application 61/387,005, titled "System, methods, and user interface for context-based search", filed by the present inventor on Sep. 28, 2010. U.S. patent application Ser. No. 12,972,462 claims priority to U.S. Provisional Patent Application 61/299,823, titled "System and methods for automated document topic discovery, browsable search, relevance ranking, summary generation and display", filed by the present inventor on Jan. 29, 2010, U.S. Provisional Patent Application 61/306,523, titled "System and methods for efficient email indexing, search, and storage", filed by the present inventor on Feb. 21, 2010, and U.S. Provisional Patent Application 61/306,524, titled "System, methods, and user interface for extracting and displaying symbolic elements from user-created contents", filed by the present inventor on Feb. 21, 2010. The contents of the above applications are incorporated herein by reference.

BACKGROUND

The present application relates to information management technologies, and more particularly, to technologies for document search and relevance ranking, automated topic discovery in documents, and automated methods for providing fast and accurate search results.

Information overload is a common problem in the information age. Accurate and efficient information access, including collection, storage, organization, search and retrieval is the key to success in this information age.

Much of the information is contained in natural language contents, such as text documents. One particular challenge in information management is to efficiently handle what is called the "unstructured data". Usually, a document collection in its natural state is unorganized, or in a so-called unstructured state. Examples of such documents can include Web pages scattered over the Internet, documents in a company or other organizations, and documents on personal computers.

Various theoretical and practical attempts have been made to organize and determine the amount and relevancy of the information in natural language contents. Conventional techniques include search engines and document classification systems. In document search, information in the unstructured document data is accessed by sending queries to a search engine or index server that returns the documents believed to be relevant to the query. One problem with using queries to access unknown data is that the users often do not know what information is contained in the documents. Thus users often cannot come up with the right key words to effectively retrieve the most relevant information. Another problem is that conventional search engines cannot accurately determine the amount of information or the focus of information contained in a document, such that the results produced by conventional search engines usually contain many irrelevant data. Often, time is wasted before the needed information is found.

There is still a need for technologies that can provide more efficient ways for finding the needed information among a large number of documents, and provide alternative ways to conventional search in finding such information.

SUMMARY

The presently disclosed systems and methods are intended to overcome the above described drawbacks and meet the challenges in the conventional information management techniques.

The present invention provides a user with various context information when performing a search. The present invention allows the user to specify context terms relevant to his or her search query, and in response, provides more accurate search results. The disclosed methods are more accurate and effective, and can save a user's time and effort in finding the needed information, as compared to conventional search techniques.

The present disclosure provides novel methods for the automatic identification or discovery of the potential topics in a document, or a portion of a document, or a collection of multiple documents. Moreover, the terms in such document objects can be ranked according to their respective degrees of prominence in terms of representing the information focus of the document.

The present disclosure further provides methods for the application of such information focus data as solutions to organizing the unstructured data, in terms of facilitating more accurate and faster search and retrieval of needed documents.

In a general aspect, the present invention relates to a computer-assisted method for discovering topics in a document. The method includes obtaining a first group of text units in a first document by a computer system, each of the text units in the first group comprises one or more words; tokenizing the first group of text units by the computer system to produce a plurality of tokens that include a jth token; assigning token types to the tokens in the first group of text units according to the grammatical roles of the tokens; assigning weighting coefficients to the tokens in the first group of text units according to the token types of the tokens; for each text unit in the first group that includes the jth token, adding a weighting coefficient to a parameter token_j_count; dividing a cumulative value of the parameter token_j_count obtained from the first group of text units by the total number of text units in the first group to produce an internal term prominence (ITP) value for the jth token; calculating a term prominence value for the jth token using at least the ITP value of the jth token; selecting one or more tokens from the plurality of tokens at least in part based on the term prominence values of the respective tokens; and outputting, by the computer system, one or more topic terms comprising the selected one or more tokens to represent the topics in the first document.

Implementations of the system may include one or more of the following. Each of the text units is a sentence or a paragraph. The first group of text units can be obtained from a portion of the first document. The one or more tokens are selected from the plurality of tokens if their respective term prominence values are above a predetermined threshold. The value of the weighting coefficient can be dependent on the grammatical role of the jth token. The computer-assisted method can further include obtaining a data set comprising a plurality of external term prominence (ETP) values each associated with one of the plurality of tokens including the jth token, wherein the ETP value is calculated using external documents different from the first document, wherein the term prominence value for the jth token is calculated using the ITP and the ETP values of the jth token. The data set can be obtained by the following steps: tokenizing a second group of text units in the external documents to produce a plurality of tokens comprising the jth token; for each text unit in the second group of text units that includes the jth token, adding a weighting coefficient to a parameter token_j_count, wherein the value of the weighting coefficient is dependent on the grammatical role of the jth token; and calculating an external term prominence value (ETP) for the jth token by dividing a cumulative value of the parameter token_j_count obtained from the second group of text units by the total number of text units in the second group of text units. The values of the weighting coefficients can be constant for different tokens. The term prominence value can be equal to the ITP value subtracted by the ETP value. The term prominence value can be the square of ITP value divided by the sum of the ITP value and the ETP value. The external documents can be randomly selected. The text unit can include a sentence, wherein the token types comprises one or more of a first token type defining a token that matches the subject of the sentence, a second token type defining a token that is the head of a multi-word phrase in the subject of the sentence, a third token type that is a modifier in a multi-word phrase in the subject of the sentence, or a fourth token type defining a token that matches the predicate of the sentence. The token types can include one or more of a fifth token type defining a token that is the head of a sub-phrase in the predicate of the sentence, a sixth token type defining a token that is a modifier in a sub-phrase in the predicate of the sentence, or a seventh token type defining a token that is in any other text in the sentence.

In another aspect, the present invention relates to a computer-assisted method for ranking documents based on the topics contained in the documents. The method includes obtaining a first group of text units in one of the documents in a document collection by a computer system, each of the text units comprises one or more words; tokenizing the first group of text units by the computer system to produce a plurality of tokens that include a jth token; assigning token types to the tokens in the first group of text units according to the grammatical roles of the tokens; assigning weighting coefficients to the tokens in the first group of text units according to the token types of the tokens; for each text unit in the first group that includes the jth token, adding a weighting coefficient to a parameter token_j_count; dividing a cumulative value of the parameter token_j_count obtained from the first group of text units by the total number of text units in the first group to produce an internal term prominence (ITP) value for the jth token; obtaining a data set comprising a plurality of external term prominence (ETP) values each associated with one of the plurality of tokens including the jth token, wherein the ETP value is calculated using a second group of text units from external documents outside of the document collection; calculating a term prominence value for the jth token using the ITP and the ETP values of the jth token; receiving a query comprising a keyword against a collection of documents containing text; matching the keyword to one of the plurality of tokens to obtain a matched token; and ranking, by the computer system, the documents by the term prominence values for the matched token associated with their respective documents.

Implementations of the system may include one or more of the following. The computer-assisted method can further include outputting, by the computer system, one or more documents that have the highest term prominence values for the matched token in the collection of documents. The first group of text units can be obtained from a portion of the one of the documents in the collection.

In another aspect, the present invention relates to a computer-assisted method for assisting a user to search for documents or other file objects. The method includes receiving a query comprising a queried term from a user; obtaining, by a computer system, a first context term list comprising a first context term semantically related to the queried term; obtaining and displaying a first search result; displaying the first context term list in response to the query; allowing the user to select the first context term in the first context term list; obtaining, by the computer system, a second context term list comprising a second context term semantically related to the queried term and the first context term; and displaying a second search result and the second context term list in a user interface in response to the selection of the first context term in the first context term list.

Implementations of the system may include one or more of the following. The computer-assisted method can further include allowing the user to select the second context term in the second context term list; and displaying a third search result and a third context term list in response to the selection of the second context term in the first context term list. The second search result is in response to a new search based on the first context term selected by the user. The queried term comprises a string of characters entered by the user, wherein the first context term list is dynamically obtained in response to the string of characters. The user is allowed to select multiple context terms in the first context term list, wherein the second context term is semantically related to the multiple context terms, wherein the second search result is obtained based on the multiple context terms selected by the user. The computer-assisted method can further include allowing the user to indicate the degree of relevance of the one or more context terms in the first context term list, wherein the second search result is obtained based on a combination of the one or more context terms according to the indicated relevance of the one or more context terms in the first context term list. At least one of the first context term list, or the second context term list is pre-compiled and stored in association with the queried term in a database. The computer-assisted method can further include storing one or more context terms in association with a searchable term in a database, wherein the one or more context terms are semantically related to the searchable term, wherein the step of obtaining a first context term list comprises: matching the queried term to the searchable term in the database; and retrieving the one or more context terms semantically related to the searchable term as the first context term semantically related to the queried term. The computer-assisted method can further include identifying one or more topic terms potentially relevant to the searchable term in a document collection comprising a plurality of documents; calculating a relevance score for each of the one or more topic terms potentially relevant to the searchable term; selecting at least one of the one or more topic terms based on its relevance score; and storing the one of the one or more topic terms as a context term list in association with the searchable term in the database. The step of identifying one or more topic terms potentially relevant to the searchable term comprises: obtaining a first group of text units in the document collection, wherein the text unit comprises a plurality of words; tokenizing the first group of text units by the computer system to produce a plurality of tokens that include a jth token; assigning token types to the tokens in the first group of text units according to the grammatical roles of the tokens; assigning weighting coefficients to the tokens in the first group of text units according to the token types of the tokens; for each text unit in the first group that includes the jth token, adding a weighting coefficient to a parameter token_j_count; dividing a cumulative value of the parameter token_j_count obtained from the first group of text units by the total number of text units in the first group to produce an internal term prominence (ITP) value for the jth token; selecting one or more tokens from the plurality of tokens at least in part based on the ITP values of the respective tokens; and outputting the one or more topic terms associated with the document collection, the one or more topic terms comprising the selected one or more tokens.

The computer-assisted method can further include identifying one or more topic terms potentially relevant to the searchable term in a first document; calculating a relevance score for each of the one or more topic terms potentially relevant to the searchable term; selecting at least one of the one or more topic terms based on its relevance score; and storing the one of the one or more topic terms as a context term in association with the searchable term in the database. The step of identifying one or more topic terms potentially relevant to the searchable term in a first document can include obtaining a first group of text units in the first document, each of the text units in the first group comprises one or more words; tokenizing the first group of text units to produce a plurality of tokens that include a jth token; assigning token types to the tokens in the first group of text units according to the grammatical roles of the tokens; assigning weighting coefficients to the tokens in the first group of text units according to the token types of the tokens; for each text unit in the first group that includes the jth token, adding a weighting coefficient to a parameter token_j_count; dividing a cumulative value of the parameter token_j_count obtained from the first group of text units by the total number of text units in the first group to produce an internal term prominence (ITP) value for the jth token; calculating a term prominence value for the jth token using at least the ITP value of the jth token; selecting one or more tokens from the plurality of tokens at least in part based on the term prominence values of the respective tokens; and outputting one or more topic terms comprising the selected one or more tokens to represent the topics in the first document.

The computer-assisted method can further include obtaining document properties related to the documents in the first search result by the computer system; dynamically displaying, in the user interface, the document properties related to the documents in the first search result in response to the query; and allowing the user to select at least one of the document properties, wherein the second search result is obtained based on the query, the first context term, and the at least one of the document properties selected by the user. The document properties can include file types, file locations, file creation date, file publishing date, author, or other metadata of the documents, wherein the number of documents having each document property is dynamically displayed in the user interface in association with the respective document property.

In another aspect, the present invention relates to a computer-assisted method for assisting a user to search for documents or other file objects. The method includes: receiving a query comprising a queried term from a user; obtaining, by a computer system, a first search result comprising a plurality of documents; obtaining document properties related to the documents in the first search result by the computer system; dynamically displaying, in a user interface, the document properties related to the documents in the first search result in response to the query; allowing the user to select at least one of the document properties; and obtaining a second search result based on the query and the at least one of the document properties selected by the user.

Implementations of the system may include one or more of the following. The document properties can include file types, file locations, file creation date, file publishing date, author, or other metadata of the documents, wherein the number of documents having each document property is dynamically displayed in the user interface in association with the respective document property. The queried term can include a string of characters entered by the user, wherein the document properties related to the documents in the first search result are dynamically obtained in response to the string of characters.

Although the invention has been particularly shown and described with reference to multiple embodiments, it will be understood by persons skilled in the relevant art that various changes in form and details can be made therein without departing from the spirit and scope of the invention.

BRIEF DESCRIPTION OF THE DRAWINGS

The following drawings, which are incorporated in and form a part of the specification, illustrate embodiments of the present invention and, together with the description, serve to explain the principles of the invention.

FIG. 1 illustrates an example of the Object-Properties Association definition of the object "computer" in accordance with the present invention.

FIGS. 4A and 4B are exemplar data structures comprising terms and their associated prominence values for different token types as external data.

DETAILED DESCRIPTION

Figure 2:
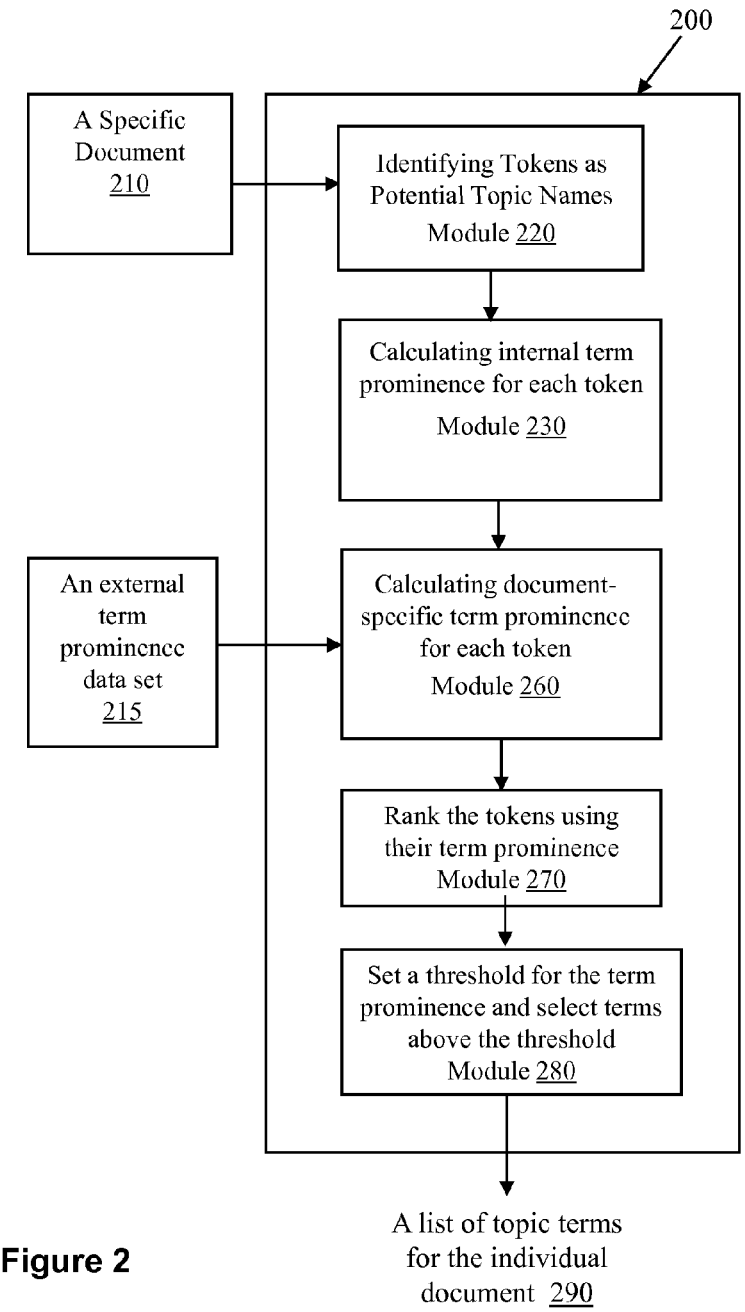
FIG. 2 is an exemplar system diagram for discovering potential topics in a specific document in accordance with the present invention.

The present disclosure is based on a theoretical framework developed by the present inventor about aspects of human knowledge and linguistic information.

Human knowledge, or aspects of human knowledge, can be represented in various ways. While internal knowledge representations are functions of human brains, external or artificial representations such as Frame Representation and Semantic Networks are simulation models for certain aspects of such internal knowledge.

The present invention is based on a novel model developed by the present inventor for knowledge and linguistic information representation. The model, called Object Properties Association Model (OPAM), states that part of human knowledge is based on concepts about objects and their associated properties, or based on relationships between different objects. Certain objects are perceived as the properties of other objects. Certain objects are associated with other objects in ways that uniquely define the concepts of such other objects. Simply put, OPAM contends that an object can be uniquely defined by all its associated properties each of which carries a varying amount of information about the object.

As an example, an object named "computer" is defined by the Merriam-Webster online dictionary as "one that computes; specifically: a programmable usually electronic device that can store, retrieve, and process data". However, the OPAM model of the present disclosure has a different approach to represent our knowledge about the object of "computer". Referring to FIG. 1, in the OPAM model, the object named "computer" is characterized by a plurality of associated properties such as "CPU", "motherboard", "memory", "hard disk", "operating system", "speed", "case", "software", etc., that are associated with the object "computer". The prominence of the association between "computer" and each of the properties is characterized by a numerical value herein called association strength. Hypothetical values for the association strengths for "CPU", "motherboard", "memory", "hard disk", "operating system", can for example respectively be 0.99, 0.90, 0.95, 0.80, and 0.98. A higher association strength value can represent a stronger association between the property and the object. The object "computer" can be uniquely defined by the associated properties and their respective association-strength values. Moreover, the association-strength value for a property is specific to the object, and usually varies for different objects. For example, the property "color" may have an association-strength value of 0.8 if the object is "flower", but an association-strength value of 0.2 if the object is "computer".

Conventional knowledge representation models such as the Frame Representation and Semantic Networks focus on the types of relationships between different objects and their derived relationships, such as a tree-like structure of parent-children relationships among different objects. OPAM model of the present invention, in contrast, focuses on what properties are associated with a particular object and their association strength or defining power to the object. OPAM is not focused on the exact types of relationships between the properties and the object.

In OPAM, the object can be a physical object, or an abstract object such as a concept, and can be represented by a symbolic name in a language such as a word, a list of words or a phrase, a character string, a query, a sub-component of a query, a topic, or the name of a document category.

It should be noted that as the present disclosure involves natural languages, and makes references to certain grammatical terms such as a "sentence", and the "subject" and "predicate" of a sentence, the term "object" used in the present disclosure is different from the grammatical term of "object" that refers to the object of a transitive verb, such as a noun or a pronoun, which may be in the accusative case in certain languages. In the present disclosure, this sense of "object" is not used. The sense of "object" used in the present disclosure is a thing or a concept with a name.

Properties of an object can have varying degrees of prominence or association strengths to the object. While the properties are "defining features" of an object, the association strengths in OPAM specify that some properties are more "defining" than others. For example, the object of "computer" is associated with various properties such as having a CPU, memory, a case, a hard disk, as shown in FIG. 1. The property "CPU" having an association-strength of 0.99 is a more defining feature of the object "computer" than the property "case" that has an association-strength value of 0.2.

The OPAM also states that such object-properties relationships are contained in our everyday language. Corresponding to the grammatical structure, there is an information structure in the language we use. Take a simple declarative sentence for example. A simple declarative sentence consists of two parts, the subject and the predicate. In linguistics, a common understanding is that the subject is what the sentence is about, and the predicate tells something about the subject. In the following simple sentences:

1A: "John is a student."
1B" "John is intelligent."

"John" is the subject of the sentences, while "is a student" and "is intelligent" are respectively the predicates of sentences 1A and 1B.

In the OPAM model, the predicate is interpreted as providing a piece of measurable information about the subject of the sentence. The OPAM model also states that human languages convey information in the basic form of stating that an object has certain properties, or an object is associated with certain other objects as being its properties. The general information structure for a simple declarative sentence is "Object O has or is associated with Property P", or O+P, corresponding to the grammatical structure of "Subject+Predicate", where the Subject is the name of an object, and the Predicate is a declaration that the object has (or is associated with) one or more properties. In the present disclosure, the use of "simple sentence" and "simple declarative sentence" is interchangeable.

The simple sentence 1A is a statement about two objects of "John" and "student". In a conventional understanding, the speaker is telling something about John (that he is a student). In a mathematical or logical interpretation, the object "John" is declared to be a member of the object class of students. In the presently disclosed OPAM, the object "John" is said to have or to be associated with a property of "being a student". The speaker is providing a piece of information about the object of "John". The simple sentence 1B associates another property with the object of "John" (that he is intelligent), thus providing another piece of information about the object of "John".

The same information structure in the simple sentences can also hold in complex sentences, as well as the grammatically distinguished compound sentences. A complex sentence is a sentence that contains other (embedded) sentences or clauses as its components. For example, in the complex sentence "I know that you are intelligent", the predicate "know that you are intelligent" contains another sentence of "you are intelligent", which has its own subject ("you" in this case) and predicate ("are intelligent"). Complex sentences, and simple sentences contained in them, can be recursively reduced to the atomic Subject+Predicate structure, corresponding to the basic information structure of Object+Property.

In conventional grammar, a compound sentence is a sentence that contains two or more independent clauses, or non-embedded clauses, such as "John is a student, and Mary is a teacher." in which the two clauses do not contain each other. For convenience, in the present disclosure, the term "complex sentence" refers to both the complex sentence and the compound sentence.

The subject or the predicate of a sentence can be in the form of a single word, a string of words or a phrase, or an embedded clause.

In linguistics, a phrase that consists of multiple words is often called a complex phrase, with an internal structure of "Modifiers+Head". For example, in the phrase "digital cameras", "digital" is the modifier, while "cameras" is the head.

The order of the head vs. the modifiers in the phrase depends on the specific languages. In English, the head of a noun phrase may either be before or after the modifier. For example, in the phrase "the observed facts" and "the facts observed", the head noun of "facts" can be before or after the modifier. Under the OPAM model of the present invention, the informational structure of a complex phrase can also be represented by Object+Property, corresponding to the grammatical structure of the Head+Modifier. For example, in the phrase "digital camera", "digital" is interpreted as a property of the object of camera.

A document can include one or more paragraphs. Each paragraph can include one or more simple and/or complex sentences.

Details about other aspects of the Object-Properties Association Model is disclosed in commonly assigned U.S. patent application Ser. No. 12/573,134, titled "System and Methods for Quantitative Assessment of Information in Natural Language Contents", filed on Oct. 4, 2009, and Provisional Patent Application 61/143,140, titled "System and Methods for Quantitative Assessment of Information in Natural Language Contents" filed on Jan. 7, 2009, both by the present inventor.

In the above referenced disclosure, the focus is on the calculation of the information quantity of a specific text unit for a specific object. In the present disclosure, the focus is on identifying the general information focus of a document, a sub-segment of a document, or a document collection comprising a plurality of documents.

In the present disclosure, the OPAM model further states that the symbolic names of objects and properties, such as a word, a multiword phrase, or any sequence of words or phrases, referred to hereafter as a term or terms, also represent the information focus (of deferent degrees) of the linguistic units that contain them, such as a sentence, a paragraph, or a document, and thus can be treated as potential topics or subjects of interest of such linguistic units.

In the present disclosure, the OPAM model further states that while property names (or property terms) provide varying amounts of information about the object, the object names are of a higher degree of information focus in the sentence than property names. Thus, it is interpreted that the subject of a sentence in a document usually receives more information focus than other constituents of the sentence; and the head of a complex phrase usually receives more information focus than a modifier in the phrase. In OPAM model, this is the principle of degree of information focus based on the grammatical role of a term.

The model further states that for a given document, or a sub-segment of a document, or a document collection, the strength or the degree of the information focus represented by a particular term is further determined by the prominence of the term inside the document, or its sub-segments, or the document collection, herein called "the internal term prominence" (ITP), together with the prominence of the term outside the document or document collection, herein called "the external term prominence" (ETP).

In quantitatively assessing the strength of information focus of a term, the present disclosure first uses a weighting coefficient method to distinguish the degree of information focus on terms that play different roles in the linguistic structure.

And then, the present disclosure provides methods for the calculations of the values of both the internal term prominence (ITP), and the external term prominence (ETP), and methods for calculating the document-specific term prominence (DSTP) as a measure of the strength of a term's information focus in the document.

FIG. 2 is an exemplified system diagram for discovering the potential topics of a specific document. A system 200 includes a plurality of functional modules. First, a specific document 210 is stored in the storage media in a computer system, and accessed by the system 200. Each term in the documents is extracted as a potential topic term by module 220. The Internal Term Prominence value for each token is calculated by module 230. On the other hand, an external term prominence data set 215 is also stored in the storage media in a computer system, and accessed by the system 200.

The data set 215 includes a plurality of terms; each is associated with a plurality of values representing the context-dependent prominence scores of the term in a large randomly selected document collection. FIGS. 4A and 4B show examples of such a data table showing hypothetical term names and associated values of their external prominence score.

For a specific document, the Document-Specific Term Prominence (DSTP) value for each token is calculated by module 260, using the values from module 230 and data table 215. Then, all the tokens are sorted in descending order by their DSTP values module 270, and a threshold value is determined in module 280 to select those that have their DSTP value above the set threshold, and the selected tokens are output by the system as a list of topic terms of the specific document 290.

The present disclosure provides methods for first calculating the external term prominence data, with a special data structure to represent such data, and methods for storing the data for later use and reuse.

Figure 3:
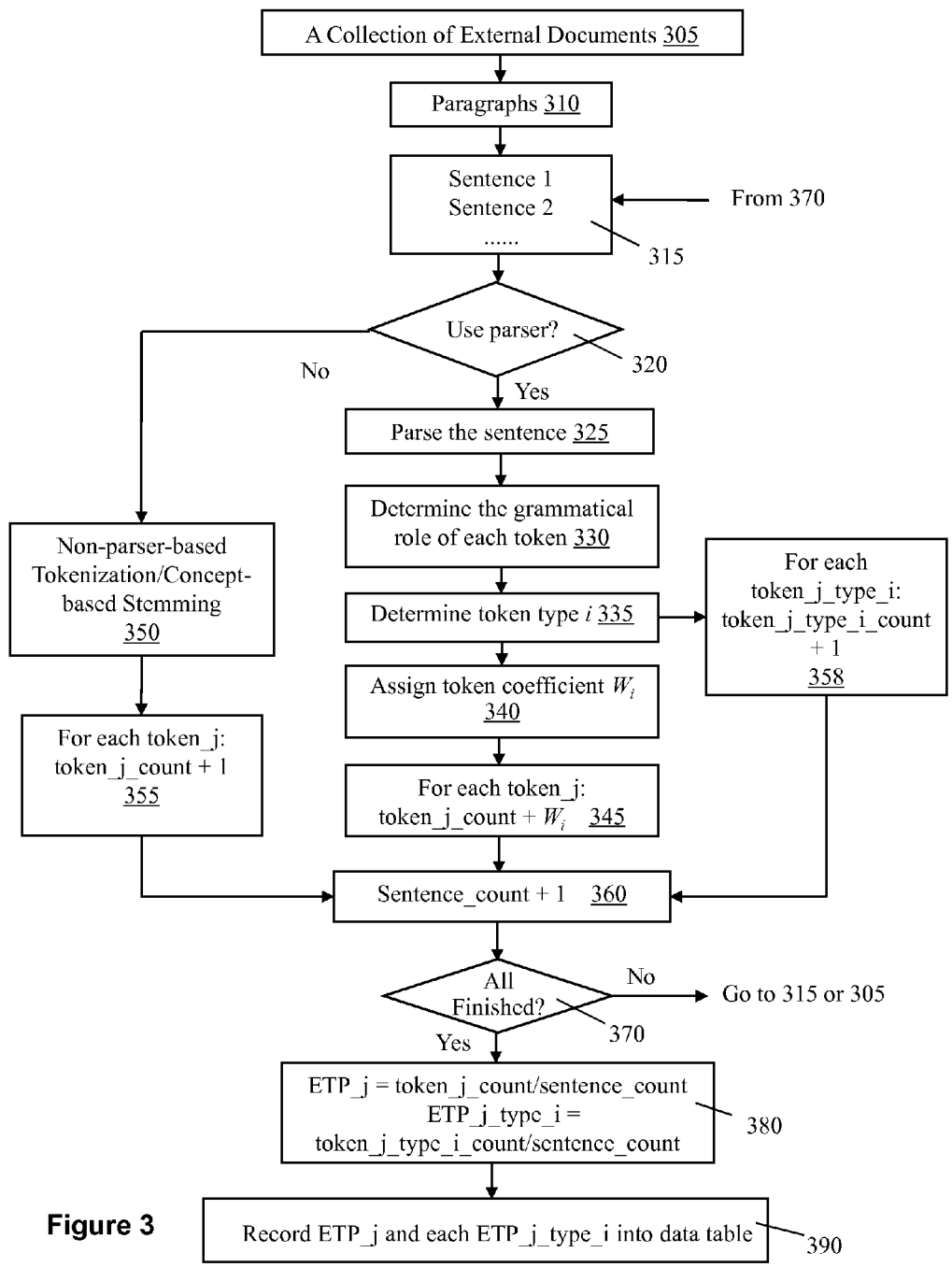
FIG. 3 is an exemplar flow diagram for automatically and quantitatively identifying external term prominence values from a non-specific collection of documents.

FIG. 3 illustrates detailed steps for calculating the external term prominence ETP score for a plurality of terms from a large randomly selected document collection. For each document in the collection (step 305), the document is broken into smaller units of paragraphs and sentences (Steps 310, 315).

Next, a decision is made whether a syntactic parser is to be used or not (320). The use of a syntactic parser is preferred, but not required.

A syntactic parser is in most cases a rule-based procedure, mostly embodied in the form of a computer program. It receives a string of characters, such as a sentence or an equivalent, and outputs a structural description of the grammatical relations between various components of the sentence. Syntactic parsers of various types can be freely or commercially available, or can be constructed based on rules one wishes to employ. The syntactic parser can be used to divide a complex sentence into simple sentences, and then divide a simple sentence into a subject and a predicate. It can further divide a multi-word complex phrase into its components such as a head and its modifiers. As it is known, a syntactic parser may not always produce a structural description of a sentence that conforms to the understanding by human language users.

Depending on whether a syntactic parser is used or not, for each sentence, words and/or phrases in the sentence are extracted as tokens or potential topic names using corresponding methods (steps 325, 350).

Depending on the specific language being processed, a process called stemming may be employed. This usually applies to Western languages, such as English and other members of the Indo-European language family, but not always applicable in many of the Eastern languages. When it applies, as an optional step, the presently disclosed methods provide a novel approach of concept-based stemming in the tokenization of the sentences in the raw data. The concept-based stemming merges only those words that are morphological variations of the names of the same concept or object name, for example, the plural form of a noun with the singular form of the same noun in English. In English, certain morphological variations of verbs, such as those for tense and aspects (e.g. "go", "went", and "gone") have their own shades of meaning and thus are not recommended for stemming. Variations for subject-verb agreement, such as "go" vs. "goes", are recommended for merging since they are referring to the same concept of an action. One aspect of the presently disclosed methods is that different rules of morphological consolidation can be used for specific languages. This concept-based stemming method is different from common practices in the conventional document retrieval or classification.

In some aspects, the so-called "stop words" can be included in the presently disclosed methods. Some words that are treated as "stop words" in conventional techniques are considered here to be also meaning-carrying units in the language, which may be part of the names of potential properties of certain objects. For example, "the" and "a" in English are conventionally excluded from text analysis as non-meaning-carrying words. However, phrases such as "a house" and "the house" can be very different in meaning under different contexts. In a legal document about the ownership of a house, a sentence "He owns a house" can have a very different consequence from the sentence "He owns the house". Since the present system and methods involve the meanings of natural languages, such conventional "stop word" can be included.

If a parser is used, as in step 325, each sentence is parsed by the parser to identify the grammatical components of the sentence such as the subject, the predicate and detailed structures within the subject and the predicate, or other parts of the sentence (step 330). For a multiword complex phrase, the parsing operation can identify the head and the modifier of the phrase.

Each token in the sentence is assigned a token type according to its grammatical role in the sentence as determined by the syntactic parser (step 335). An exemplified Token Type definition can include the following:

If the token matches the subject, the token is marked as a Type 1 token.

If the subject is or contains a multi-word phrase and the token is the head of the multiword phrase, the token is marked as a Type 2 token.

If the subject is or contains a multi-word phrase and the token is a modifier in the multiword phrase, the token is marked as a Type 3 sentence.

If the token matches the predicate of the sentence, the token is marked as a Type 4 sentence.

If the predicate is or contains a sub-phrase and the token is the head of the sub-phrase, the token is marked as a Type 5 sentence.

If the predicate is or contains a multiword phrase and the token is a modifier in the multiword phrase, the token is assigned as Type 6.

If the token is in any other text in the sentence, the token is marked as a Type 7 sentence.

As described above in relation to OPAM, different types of tokens may represent different degrees of information focus as a result of their being in different grammatical roles in the sentence.

Each type of token i is then assigned a weighting coefficient value (step 340). The weighting coefficient, $W_i$, can have an exemplar value between 0 and 1, the magnitude of which reflects the different degrees of likelihood that such a token may be an information focus in the sentence. Using the example of the Token Type definition described above, $W_1$ (for a Type 1 token) may be assigned a value of 1 because a term as the subject of a sentence is more likely to represent the information focus of the sentence than other types of tokens in the sentence. Thus, if the j-th token is a Type 1 token then the parameter "token_j_count" is incremented by 1 (345). Similarly, values of other weighting coefficients can be exemplarily set as $W_2=0.9$; $W_3=0.8$; $W_4=0.7$; $W_5=0.6$; $W_6=0.5$; $W_7=0.4$ for the corresponding types of tokens in accordance with the decreased likelihood that a token may represent the information focus of the sentence. In general, instead of simply counting one for each occurrence of the jth token, the contributions to "token_j_count" are the token's respective weighting coefficients that are associated with the specific type the token is in. This is mathematically equivalent to each token count being scaled by the respective weighting coefficients according to the type the token is in.

For the purpose of recording into the data structure the raw external term prominence values that are not weighted or scaled by the weighting coefficient associated with the corresponding token type, a plurality of token counters are set up for each token type i that the jth token may possibly be in. Step 358 records the count of each token type the jth token occurs in as token_j_type_i_count. So if there are a total of N token types such as defined previously, there will be N token type counters for a token for this purpose. Steps 340 and 345 are skipped so no weighting coefficient is applied. In the present disclosure, the purpose of producing this data structure with raw values is to provide flexibility for customization in using different weighting coefficient values and ranges for each token type when such data are used in calculating the topic strength values of the corresponding terms in specific documents or document collections.

If a parser is not used (step 350), as a follow up to a negative answer to the question in the step 320, the sentence bypasses the parsing and the token type and weighting coefficient assignment process from step 325 to step 345.

When this is the case, first, for the tokenization of the sentence, other methods such as single-word tokens or multi-word n-gram methods can be used (step 350).

Then, for each token in the sentence, the parameter "token_j_count" is simply incremented by 1 if the j-th token occurs in the sentence at least once (step 355). Optionally, this case of not using a parser can be treated as a special case of using the parser where the parser does not label the token with any grammatical role, and a special token type, such as type 8, can be assigned to the token to indicate that no grammatical roles are distinguished, so that all occurrences of the tokens are treated the same, or the weighting coefficient of type 8 token can be assigned the value of 1.

After all tokens in the sentence are counted, the parameter "sentence_count" is next incremented by 1 (step 360). The parameter "sentence_count" tracks the total number of sentences that passes the step 320, each of which may include potential topic terms as the information focus associated with the document. Steps 310 to 360 are repeated until all the sentences in the paragraphs and the documents are finished.

Step 370 checks if all the sentences are finished. If the sentences in the paragraphs of the document are not finished, the steps from 315 to 360 are repeated until all sentences in the document are finished. If there are additional documents in the collection, steps 305 to 360 are repeated until all the sentences in all the documents are finished.

The external term prominence for the j-th token is the cumulative "token_j_count" divided by "sentence_count", the total number of the sentences in the document collection (step 380). External term prominence for the j-th token ETP_j has a value between zero and one. The un-weighted raw external term prominence for each token type i of the j-th token ETP_j_type_i is the cumulative "token_j_type_i_count" divided by "sentence_count" (380). ETP_j_type_i also has a value between zero and one using the exemplified counting method above.

In step 390, the ETP_j and ETP_j_type_i are written into their respective fields for the j-th token in a data table.

It should be noted that Token Type definition as described in the above example can include different variations, and the weighting coefficient W can be assigned different values.

In some embodiments, the number of sentences selected in the random document collection can be a portion of the documents in step 315. The "sentence_count" can be adjusted accordingly.

In some embodiments, the text unit for counting tokens and computing ETP, and ETP_type_i can be paragraphs or documents instead of sentences. Paragraphs as text units can be viewed as a special case of treating the whole documents as text units when a document contains only one paragraph.

For example, when paragraphs are used as the text unit for calculating the term prominence, one exemplar method is that if a jth token occurs in a paragraph multiple times and in different token types, the parameter "token_j_count" is incremented only once for each paragraph it occurs in, either by the highest weight coefficient value Wi_max if a parser is used, or by the value of one if no parser is used, no matter how many times the token occurs in that paragraph, and no matter what other token types it may be in. The external term prominence for the jth token is calculated by dividing the cumulative "token_j_count" by the cumulative "paragraph_count".

The same methods are applicable when the text units used are whole documents instead of paragraphs.

The present disclosure includes a unique data structure for a pre-constructed data set 215 for use with discovering the document specific term prominence. FIGS. 4A and 4B illustrate exemplified data structures with data values produced by the method shown in FIG. 3. In this data structure, a term is associated with a plurality of fields each of which stores a numerical value that represents the external term prominence of this term in various contexts. FIG. 4A shows term values when a parser is used and not used, and when paragraphs and documents are used as the counting text units.

FIG. 4B shows the data table with raw external term prominence data for each token type as cited in steps 358, 380. The values in each field are calculated without applying the weighting coefficient corresponding to the token type, so that customization can be performed later with different weight assignment scheme if needed. Take the term "computer" for example. The data structure presents the external term prominence values of this term in a random collection for its respective roles as the subject (Type 1), the predicate (Type 2), the head of a multiword phrase in the subject (Type 3), the modifier of a multiword phrase in the subject (Type 4), the head of a multiword phrase in the predicate phrase (Type 5), the modifier of a multiword phrase in the predicate phrase (Type 6), and its other roles in a sentence (Type 7). The data structure also includes a field that stores the prominence value of the term when no such grammatical roles are distinguished (Type 8). This is also the case when no parser is used. For situations where lower precision can be tolerated, analysis without a parser can reduce cost.

It should be noted that the data structure can also include fields for data obtained from other methods based on the principles of the present disclosure but are not exhaustively listed above.

As is shown in FIG. 2, the system 200 uses such an external term prominence data set 215 produced by the above methods to calculate the topic prominence of terms in specific documents.

As has been described earlier in relation to OPAM, and shown in FIG. 2, a principle in the present disclosure is that the prominence of a term as the information focus in a document is determined by two aspects of the term:

1) the prominence of the term inside the document, called "the internal term prominence"; and 2) the prominence of the term outside the document, called "the external term prominence".

Basically, the corresponding steps in producing the external term prominence data above can be repeated for the calculation of document internal term prominence.

Figure 5:
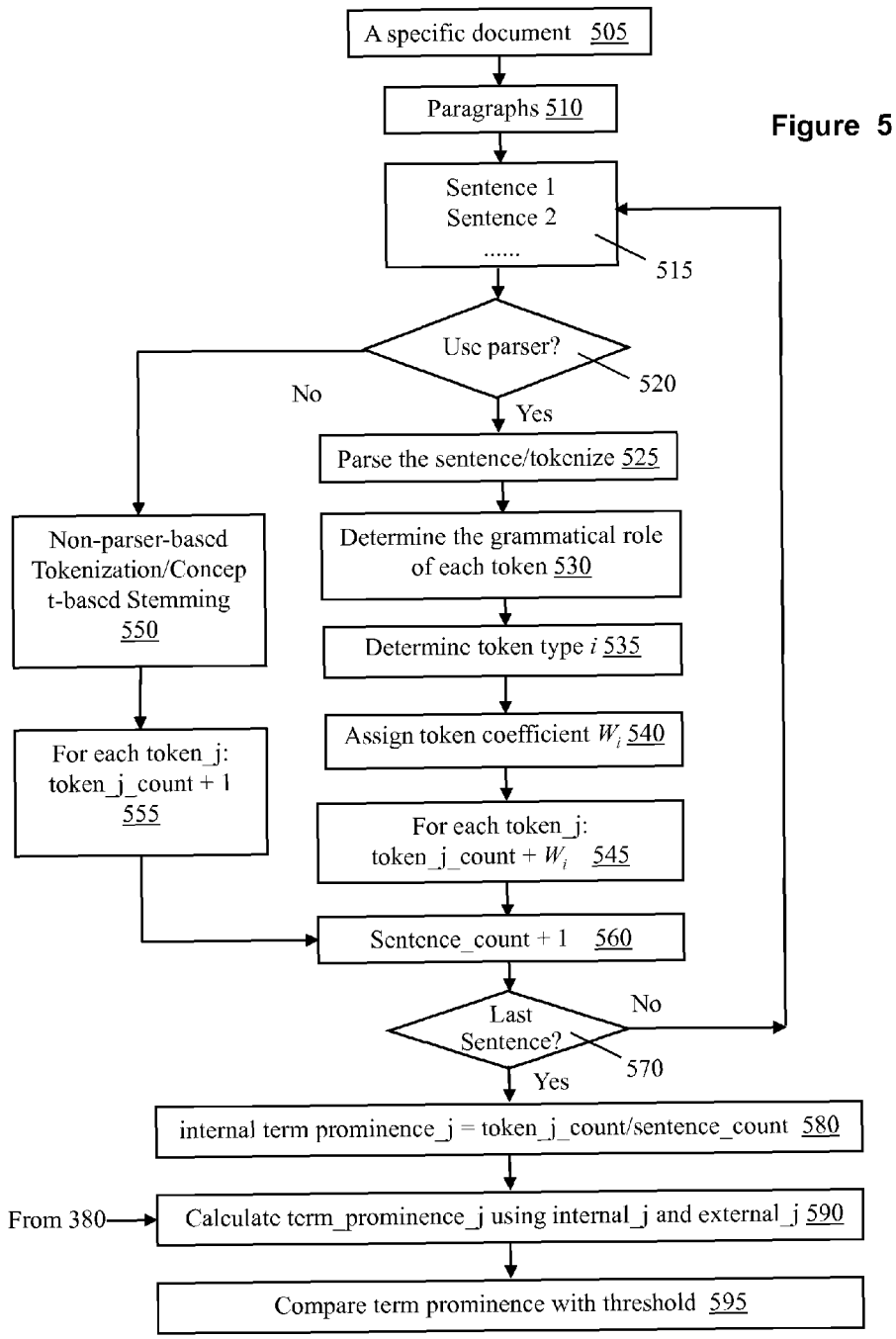
FIG. 5 is an exemplar flow diagram for automatically and quantitatively identifying topics in a document.

FIG. 5 illustrates detailed steps for calculating the internal term prominence ITP score for each term in the document. For a document in (step 505), the document is broken into smaller units of paragraphs and sentences (Steps 510, 515).

Next, a decision is made whether a syntactic parser is to be used or not (step 520). The use of a syntactic parser is preferred, but not required. However, if the data in the external term prominence data set in FIG. 4A and FIG. 4B are produced with a syntactic parser, the parser should also be used for the production of the internal term prominence to avoid inconsistency.

Depending on whether a syntactic parser is used or not, for each sentence, words and/or phrases in the sentence are extracted as tokens or potential topic names using the corresponding methods (steps 525, 550).

As described above when producing the external data set in (step 525) and (step 550), depending on the specific language being processed, a process called stemming may be employed, and a decision is made whether to included the so-called "stop words" or not. The decision and the stemming process should be the same as those for producing the external term prominence data set to avoid inconsistency.

If a parser is used, as in step 525, each sentence is parsed by the parser to identify the grammatical components of the sentence such as the subject, the predicate and detailed structures within the subject and the predicate, or other parts of the sentence (step 530). For a multiword complex phrase, the parsing operation can identify the head and the modifier of the phrase.

Similar to the steps in FIG. 3 for external term prominence data production, if a parser is used, each token in the sentence is assigned a token type according to its grammatical role in the sentence as determined by the syntactic parser (step 535). The same Token Type definition used for the external term prominence data production as exemplified above should also be used for the internal term prominence data production. The example is repeated below for convenience:

If the token matches the subject, the token is marked as a Type 1 token.

If the subject is or contains a multi-word phrase and the token is the head of the multiword phrase, the token is marked as a Type 2 token.

If the subject is or contains a multi-word phrase and the token is a modifier in the multiword phrase, the token is marked as a Type 3 sentence.

If the token matches the predicate of the sentence, the token is marked as a Type 4 sentence.

If the predicate is or contains a sub-phrase and the token is the head of the sub-phrase, the token is marked as a Type 5 sentence.

If the predicate is or contains a multiword phrase and the token is a modifier in the multiword phrase, the token is assigned as Type 6.

If the token is in any other text in the sentence, the token is marked as a Type 7 sentence.

As described above in relation to OPAM, different types of tokens may represent different degrees of the information focus as a result of their being in different grammatical roles in the sentence.

Each type of token i is then assigned a weighting coefficient value (step 540). The weighting coefficient, can have an exemplar value between 0 and 1, the magnitude of which reflects the different degrees of likelihood that such a token may be an information focus in the sentence. Using the example of the Token Type definition described above, $W_1$ (for a Type 1 token) may be assigned a value of 1 because a term as the subject of a sentence is more likely to represent the information focus of the sentence than other types of tokens in the sentence. Thus, if the j-th token is a Type 1 token then the parameter "token_j_count" is incremented by 1 (step 545). Similarly, values of weighting coefficients for other token types can be exemplarily set as $W_2=0.9$; $W_3=0.8$; $W_4=0.7$; $W_5=0.6$; $W_6=0.5$; $W_7=0.4$ for the corresponding types of tokens in accordance with the decreased likelihood that a token may represent the information focus of the sentence.

The parameter of token_j_count is incremented by the weighting coefficient Wi if the token is of type i.

If a parser is not used (step 550), as a follow up to a negative answer to the question in the step 520, the sentence bypasses the parsing and the token type and weighting coefficient assignment process from step 525 to step 545.

When this is the case, first, for the tokenization of the sentence, other methods such as single-word tokens or multi-word n-gram methods can be used (step 550).

Then, for each token in the sentence, the parameter "token_j_count" is simply incremented by 1 if the j-th token occurs in the sentence at least once (step 555). Optionally, this case of not using a parser can be treated as a special case of using the parser where the parser does not label the token with any grammatical role, and a special token type, such as type 8, can be assigned to the token to indicate that no grammatical roles are distinguished, so that all occurrences of the token are treated the same, and the weighting coefficient of type 8 token can be assigned the value of 1.

After all tokens in the sentence are counted, the parameter "sentence_count" is next incremented by 1 (step 560). The parameter "sentence_count" tracks the total number of sentences that passes the step 520, each of which may include potential topic terms as the information focus associated with the document collection.

Steps 510 to 560 are repeated until all the sentences in the paragraphs and the documents are finished (step 570). The document-internal term prominence for the j-th token is the cumulative "token_j_count" divided by "sentence_count" that is the total number of the sentences in the document (step 580). Internal term prominence for the j-th token ITP_j has a value between zero and one using the above exemplified counting methods.

As is with the production of external term prominence data, it should be noted that Token Type definition can include different variations, and the weighting coefficient W can be assigned different values, as long as they are consistent with the methods used in producing the external term prominence data.

Also as is with the production of external term prominence data, in some embodiments, the text unit for counting tokens and computing ITP can be paragraphs or documents instead of sentences, as long as they are consistent with the methods used in producing the external term prominence data.

In some embodiments, a single type of tokens, such as type 1, or a mix of a selected number of token types can be used without also using other types of tokens for the purpose of calculating the term prominence. One exemplar case for such a choice is when only the most likely topic terms need to be identified, such as type 1 or type 2 tokens.

With the internal term prominence data obtained from the above steps, and the external term prominence data available from the data set in FIG. 4A and FIG. 4B, the document-specific term prominence (DSTP) for the jth token as a potential topic name is calculated (step 590) using the internal term prominence for the j-th token (ITP_j) obtained in step 580 (FIG. 5) and the external term prominence for the j-th token (ETP_j) obtained from the data set 215 (FIG. 2).

Again, depending on the use of parser and depending on the text units being either sentences or paragraphs or entire documents, only the corresponding data in the data set in FIG. 4A should be used.

In some embodiments, customized weighting coefficient values can be used instead of the default values that are used in the production of external term prominence data set. In such cases, the data in FIG. 4B can be used with the customized weighting coefficient values with the raw data for each token type to re-calculate the external term prominence data for the use of producing the document-specific term prominence value.

In some embodiments, the document-specific term prominence (DSTP) for a jth token is computed by the following equation:

$$DSTP_j = ITP_j - ETP_j \qquad (Eqn. 1)$$

Using this method, the DSTP value for a token or a term can be in a range between −1 and 1. It should be noted that although a DSTP value can be −1 for a token, when the data for the external term prominence is in a large enough quantity and truly from random sources, most of the negative DSTP values tend to be slightly below zero. Thus, in some embodiments, negative DSTP values can be assigned to zero so that DSTP always has a value range between 0 and 1.

In some other embodiments, the document-specific term prominence DSTP can be calculated using different formulae from the above, for example, using a formula:

$$DSTP_j = ITP_j * ITP_j / (ITP_j + ETP_j) \qquad (Eqn. 2)$$

One beneficial feature of the formula in Eqn. (2) is that DSTP does not have negative values.

Whether the embodiment is using sentences as the text units, or the paragraphs or documents as text units, the final document-specific term prominence DSTP is compared with a preset threshold value (step 595). Terms of which the DSTP value is greater than the preset threshold can be selected as the prominent topic terms of the document, and can be output as a topic list to the user interface or storage as shown in module 280 (FIG. 2).

Other applications of displaying topic terms for a document are also disclosed in U.S. Provisional Patent Application 61/298,422, filed Jan. 26, 2010, and U.S. patent application Ser. Nos. 12/782,545, filed May 18, 2010, by the present inventor, It should be noted that the present disclosed methods are applicable to discovering topics in a portion of a document, a single document, or a collection of documents. Furthermore, the term prominence values of documents can be used as effective criteria to accurately rank documents in a search result from a search engine, or from any other information retrieval systems.

Producing a Topic List for a Document Collection from the Topic Lists of Individual Documents The above referenced system and methods can also identify topic terms representing a collection of documents as a whole using topic lists produced from individual documents.

In some embodiments, for a document collection containing N documents, the presently disclosed system and methods first produce the topic term list for each individual document as described above. Then, for each specific topic term, the system and methods count the number of documents this term occurs in and calculate a cumulative sum of the term prominence score from each individual score associated with each document the term occurs in. Then the cumulative sum is divided by the total number of documents the term occurs in. The resulting average term prominence score can be used as the term prominence score of that term in the specific document collection. The process is repeated for each term in the document collection, and a candidate topic list can be compiled from all terms in the document collection. A threshold can be determined to select those that have the prominence value above the threshold. Then the selected term list is sorted in descending order by the prominence score, and output as the topic list of the document collection as a whole.

A topic list of a document collection can be used as pre-written queries for searching the needed documents in the collection, and as category nodes for categorizing the document in the collection. Detailed methods for the application of such a topic list is disclosed in U.S. patent application Ser. Nos. 12/782,545, filed May 18, 2010, U.S. patent application Ser. No. 12/972,462 filed Dec. 18, 2010, all by the present inventor, the disclosures of which are incorporated herein by reference.

In the present disclosure, the methods of identifying topic terms in individual documents, and then compiling a topic list for a collection of documents are further extended to provide a search system with dynamic semantic context. The step of identifying one or more topic terms potentially relevant to the searchable term in a first document can include obtaining a first group of text units in the first document, each of the text units in the first group comprises one or more words; tokenizing the first group of text units to produce a plurality of tokens that include a jth token; assigning token types to the tokens in the first group of text units according to the grammatical roles of the tokens; assigning weighting coefficients to the tokens in the first group of text units according to the token types of the tokens; for each text unit in the first group that includes the jth token, adding a weighting coefficient to a parameter token_j_count; dividing a cumulative value of the parameter token_j_count obtained from the first group of text units by the total number of text units in the first group to produce an internal term prominence (ITP) value for the jth token; calculating a term prominence value for the jth token using at least the ITP value of the jth token; selecting one or more tokens from the plurality of tokens at least in part based on the term prominence values of the respective tokens; and outputting one or more topic terms comprising the selected one or more tokens as the topic terms from the first document.

Document Subject/Main Topics as Context of a Queried Term

Usually, a queried term can occur in documents of different subject matter or topics. For example, if the queried term is the word "engine", it may occur in documents with main topics about various cars, or about airplanes, or about search engines, etc. Such subject matter or topics constitute the context in which the queried term occurs. And such context can determine the relevance or irrelevance of the document to the query.

Furthermore, even if the queried term matches the main topics of a document, documents of the same subject matter or topics can have different focuses on certain aspects of the subject matter. For example, for documents having the main topic of "engine", some documents can be more about passenger car engines, while others are more about trucks. In such cases, the focus can be regarded as subtopics of the main topics, and such subtopics constitute the specific context for the queried term "engine" in the specific documents. The relevancy of the documents can often be a relative measure depending on the user intention. In certain cases when the user enters a queried term, the real intention may be a subtopic of the main subject matter represented by the queried term, and the user may not be aware of this, or may not be able to specify the exact terms representing the subtopic or context he is actually interested in or intends to search for. This is especially the case when the queried term may have different senses, for example, the word "bank" may mean a financial institute, or a river bank, etc.

Usually, in such cases the user needs to include additional terms in the query string as a way to specify the context, but often the user may not know what exact terms should be used for such context.

Also, generally speaking, for most of the users, writing is a more difficult process than reading. Writing is a process of creating something from nothing, which requires more mental efforts than reading or selecting from what's already available for selection. The presently disclosed system and methods provide an efficient solution for making an otherwise difficult process a lot easier for users.

Each term that occurs in one or more documents in the document collection can be a searchable term in the search index. For a searchable term, a list of topic terms can be compiled by collecting one or more topic terms from each document that either contains the searchable term, or is considered to be relevant to the searchable term. The topic terms can be used as context terms related to the searchable term. The list of topic terms is herein named the "context term list" of the searchable term. A context term can include one or more words, or phrases.

Figure 6:
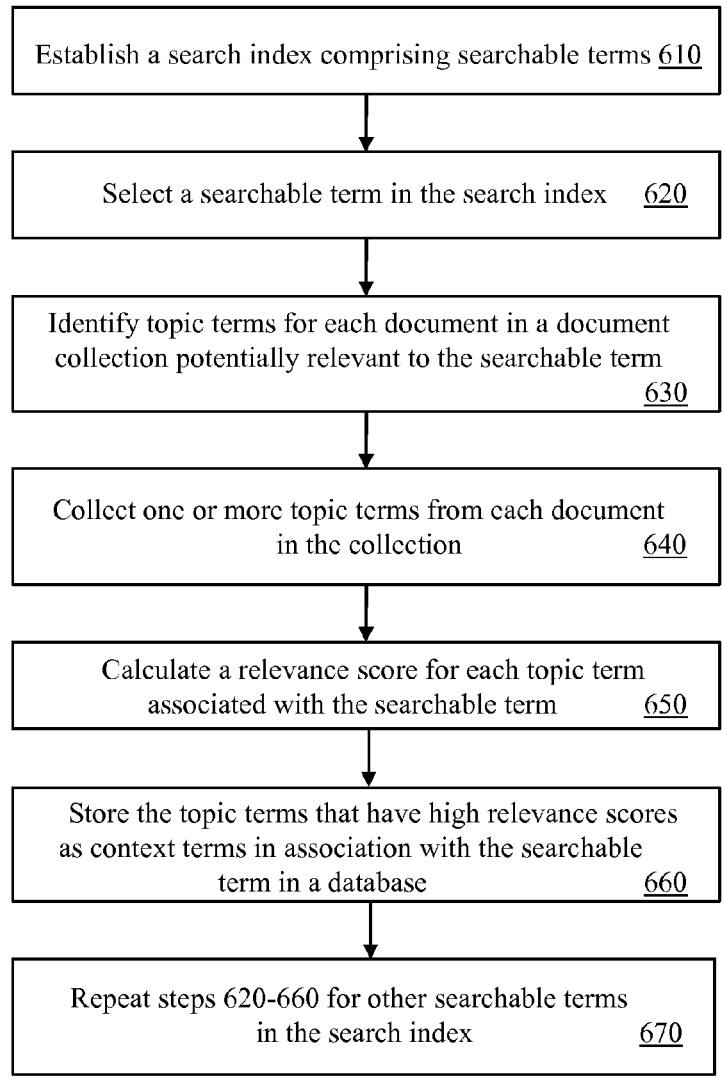
FIG. 6 is an exemplar flowchart for compiling semantically related context terms for a searchable term in a database.

FIG. 6 is a flowchart illustrating the steps for compiling semantically related context terms for a searchable term in a database. A search index comprising searchable terms is established (step 610). A searchable term is selected in the search index (step 620) for finding context terms semantically related to the searchable term. Next, a document collection is identified. The document collection can include documents that are potentially relevant to the searchable term as determined by the search algorithm. For example, the relevant documents can include documents in the search database that contain the searchable term. The types of documents in the collection can include various files on a computer or computer network, such as regular documents, notes, emails, web pages, newspaper or magazine articles, books, etc. Topic terms are identified in each document in the document collection (step 630). Suitable methods for identifying topic terms can include the process shown in FIG. 5.

One or more topic terms are collected from each document in the collection (step 640). A relevance score is calculated for each topic term in association with the searchable term (step 650). For example, the relevance score can be calculated based on the number of occurrence of a topic term in the document collection. In another example, the relevance score can be based on the prominence score of the topic term in each document in the document collection. The topic terms that have high relevance scores are stored as context terms in association with the searchable term in a database (step 660). As can be retrieved from the database, each searchable term can thus be associated with a list of context terms which can be ranked by their respective relevance scores or in alphabetical order. The steps 620-660 are repeated for other searchable terms in the search index (step 670).

Suitable methods for identifying topic terms can also include the method for discovering topic terms in a collection of document disclosed in U.S. patent application Ser. No. 12/782,545, filed on May 18, 2010, by the present inventor.

Figure 7:
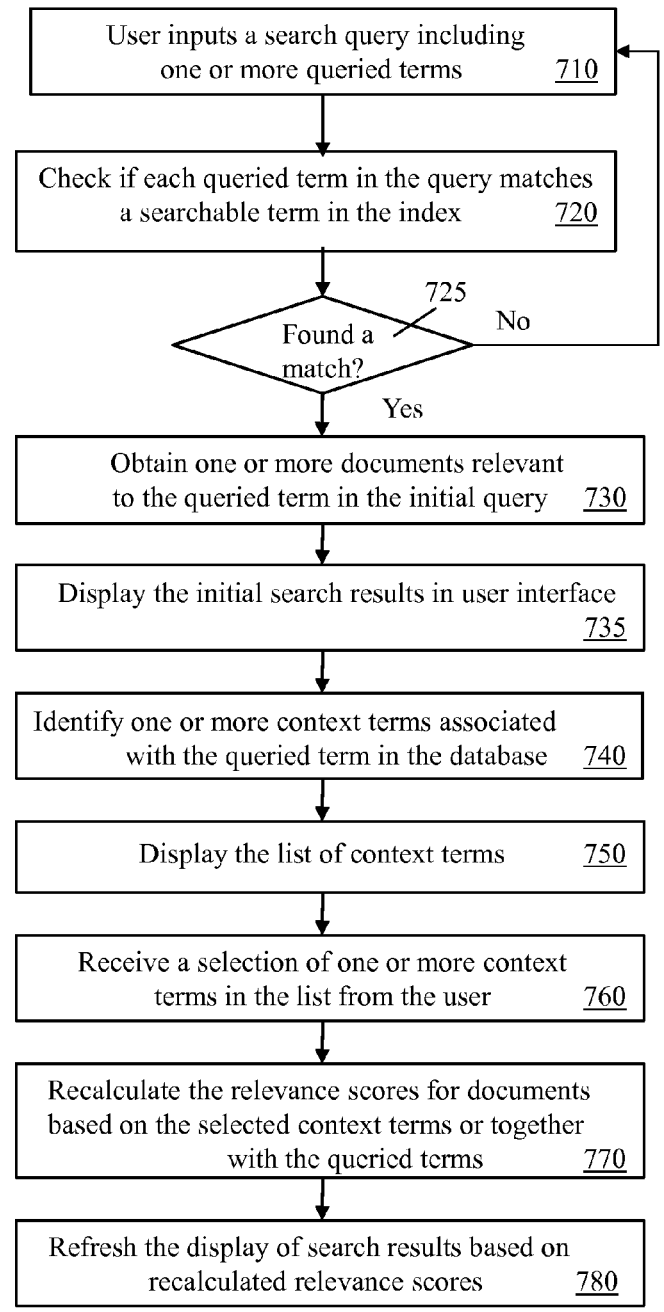
FIG. 7 is a detailed flow diagram showing the steps of providing a more accurate and faster search by providing context terms in response to a user query.
Figure 8:
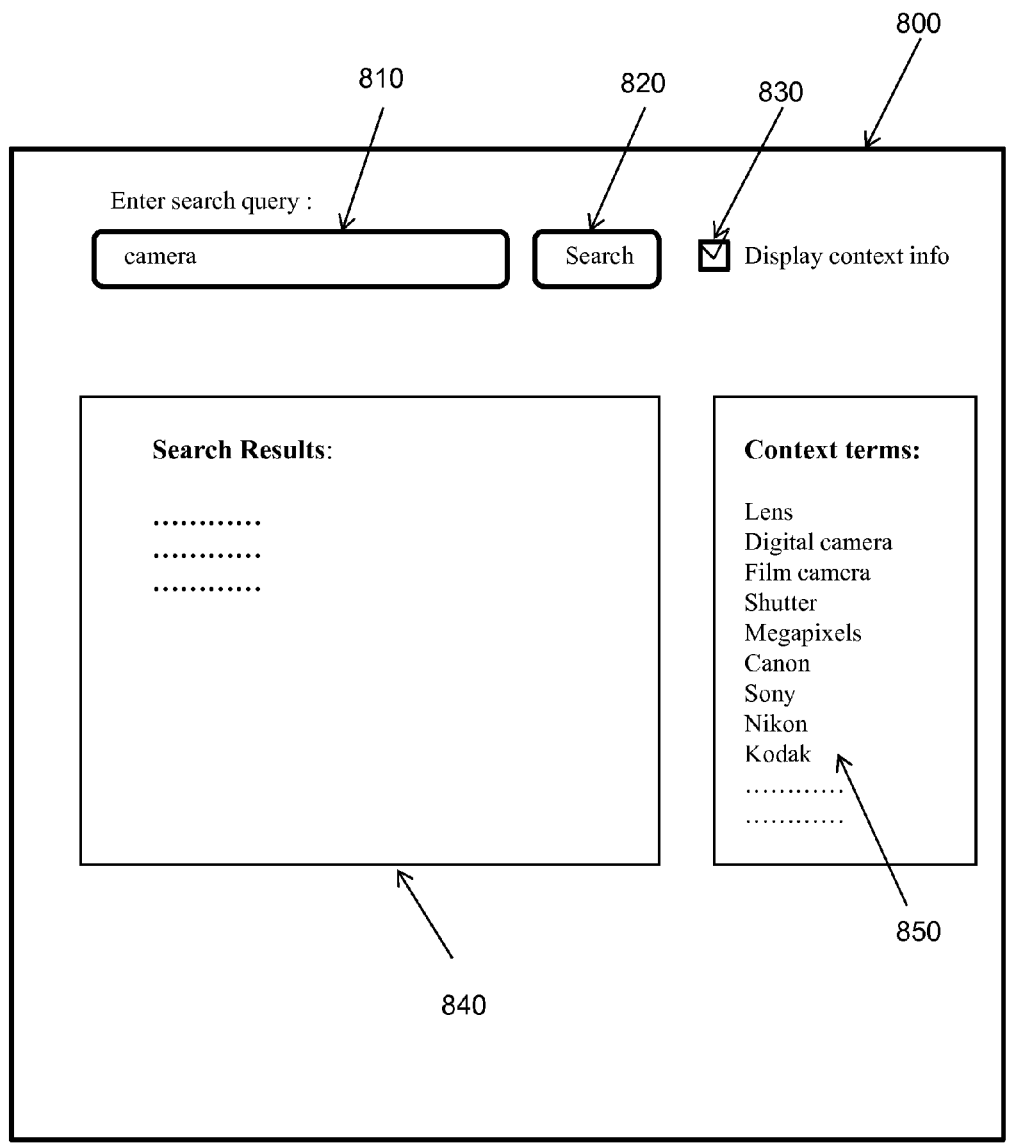
FIG. 8 is an exemplar user interface presenting context terms in real-time response to a user query.

FIG. 7 is a detailed flow diagram showing the steps of providing a more accurate and faster search by providing context terms in response to a user query. FIG. 8 shows an exemplar user interface 800 presenting context terms in real-time response to a user query. Referring to FIGS. 7 and 8, a user can enter a query term one character at a time in a query box 810 (step 710). The search can be conducted in a collection of documents on a personal computing device, on a company's network or file server, or in a library, or on the Internet, etc. The search can be automatically and dynamically initiated if the characters entered so far match a searchable term in the search index. Alternatively, the user can also click a button 820 to initiate the search after a query term is entered. The presently disclosed system checks if the query character string so far entered in the query box 810 matches with a searchable term in the search index (step 720). If no match is found, the process repeats when the next character is entered in step 710 (step 725). If a queried term comprising the characters entered so far is found to match a searchable term in the search index (step 725), one or more documents relevant to the queried term are identified and obtained as the initial search results (step 730). The initial search results 840 are displayed in the user interface 800 (step 735). The system searches the database to see if there is a context term list in the database associated with the queried term (step 740). If one or more context terms are found to be associated with the queried term, the one or more context terms 850 are retrieved from the database and displayed in the user interface (step 750) as the context term list for that specific query. The user can click a button 830 to request context terms 850 to be displayed. The context terms 850 can be displayed in a list ordered alphabetically or by the relevance values as described above (FIG. 6). If the number of terms exceeds the predetermined area for display, a scroll bar can be provided to allow a user to scroll down to see more context terms.

The user can select one or more of the context terms 850 (step 760) in the user interface 800 as additional parameters for the search, for example, by double clicking the one or more context terms. The selected context terms are used by the search system as input for the relevance calculations separately, or in combination with the original queried term(s) in the original query entered by the user (step 770). Search results 840 in the user interface 800 are automatically and dynamically refreshed (step 780) in response to user's selection of the context term(s) 850.

In some embodiments, the document collection in which the topic terms are identified in the step 630 (FIG. 6) can include some or all the documents in the search result 840. Since the search result 840 is based on and in response to a specific query, this approach allows the topic terms to be more effectively identified and more relevant to the queried term. In some embodiments, the document collection in which the topic terms are identified in the step 630 (FIG. 6) can be the same as the search result 840.

Figure 9:
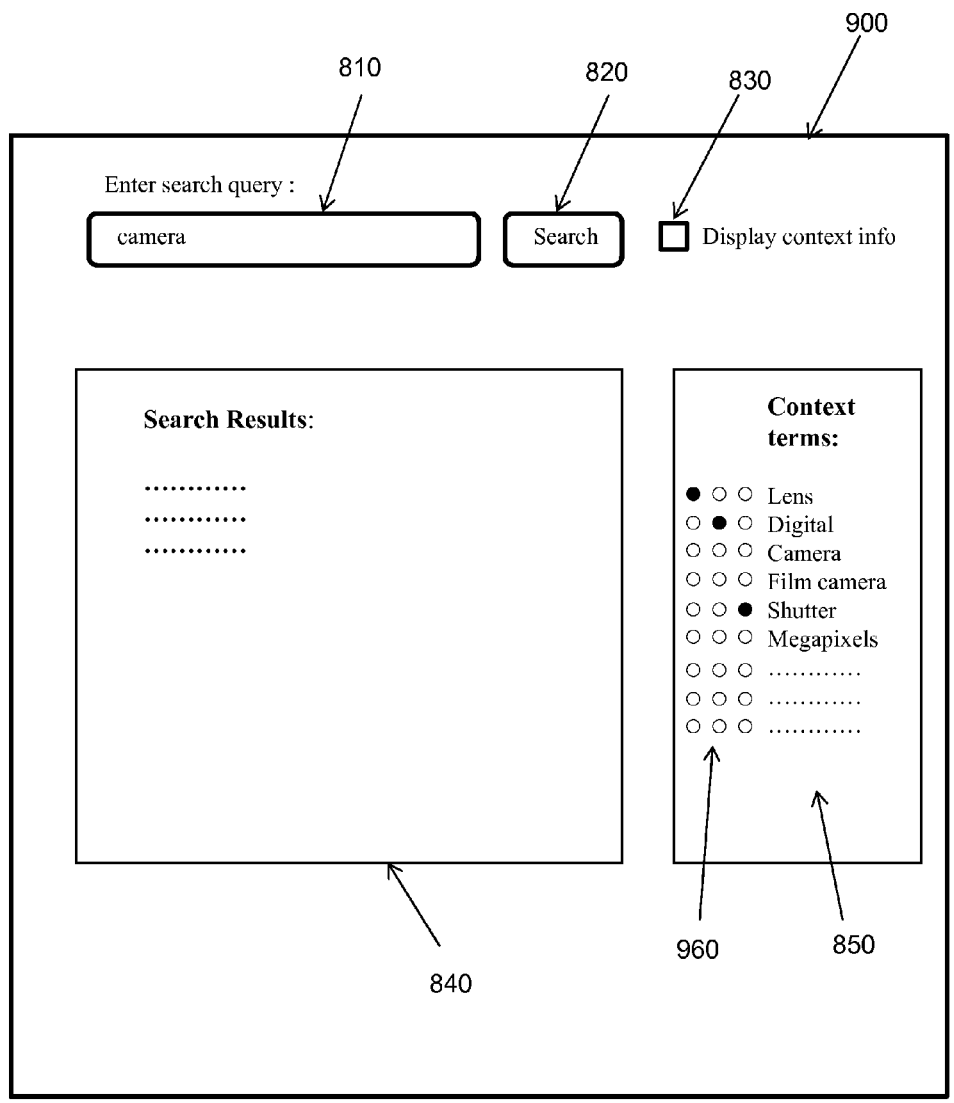
FIG. 9 is an exemplar user interface presenting context terms in real-time response to a user query and for receiving user rating of the context terms.

In some embodiments, referring to FIG. 9, additional user selectable objects 960, such as check boxes or radio buttons, are displayed next to the context terms in a user interface 900. A user can select the appropriate button to indicate whether a context term is important, less importance, or of no importance to a query. The search system recalculates the relevance scores for the documents based the original queried term and the degree of importance of the context terms indicated by the user. Depending on the user indication, a score can be assigned to the one or more context terms. For example, three choices for "very importance", "important", and "not important" can respectively have scores of 1, 0.5, and 0. The search system can use the scores as weight values in the calculation of the relevance of the documents that contain the context term. Search results 840 can be dynamically updated in response to the user's indication of the degree of importance of the context terms and in response to the queried terms 810.

Sometimes, the search results include too many potentially relevant documents even with the user selection of context terms shown in FIG. 9. In such cases, additional methods for quickly narrowing down the search scope are needed. The presently disclosed system and methods provide additional methods to assist the user to further narrow down the search results. In an exemplar case, the system uses document properties as additional context information when a user searches documents stored on a computer.

Various document file properties are available from the computer operating system, such as file type, file location, file size, author, creation/modification date/time, and other attributes or metadata of the documents, and can be used to facilitate the search. For example, document properties can be used to show that for a given queried term, such as "sales", there are 100 PDF type documents containing the word "sales", created in the last 6 months, stored in a folder named "Department A" in a company's document repository.

The search system collects such metadata associated with each document in the document collection, and compiles a list of property values from each document potentially relevant to a searchable term in the search index. The document property list can be pre-stored in the database or obtained as the query is input by the user. The system matches the queried terms, as each character is entered into the query box, with the searchable terms in the search index. If a queried term comprising the characters entered so far is found to match a searchable term in the search index, the document property list 1060 associated with that searchable term is obtained or retrieved from the database and is displayed in the user interface 1000 along with the search results 840 for the queried term.

Figure 10:
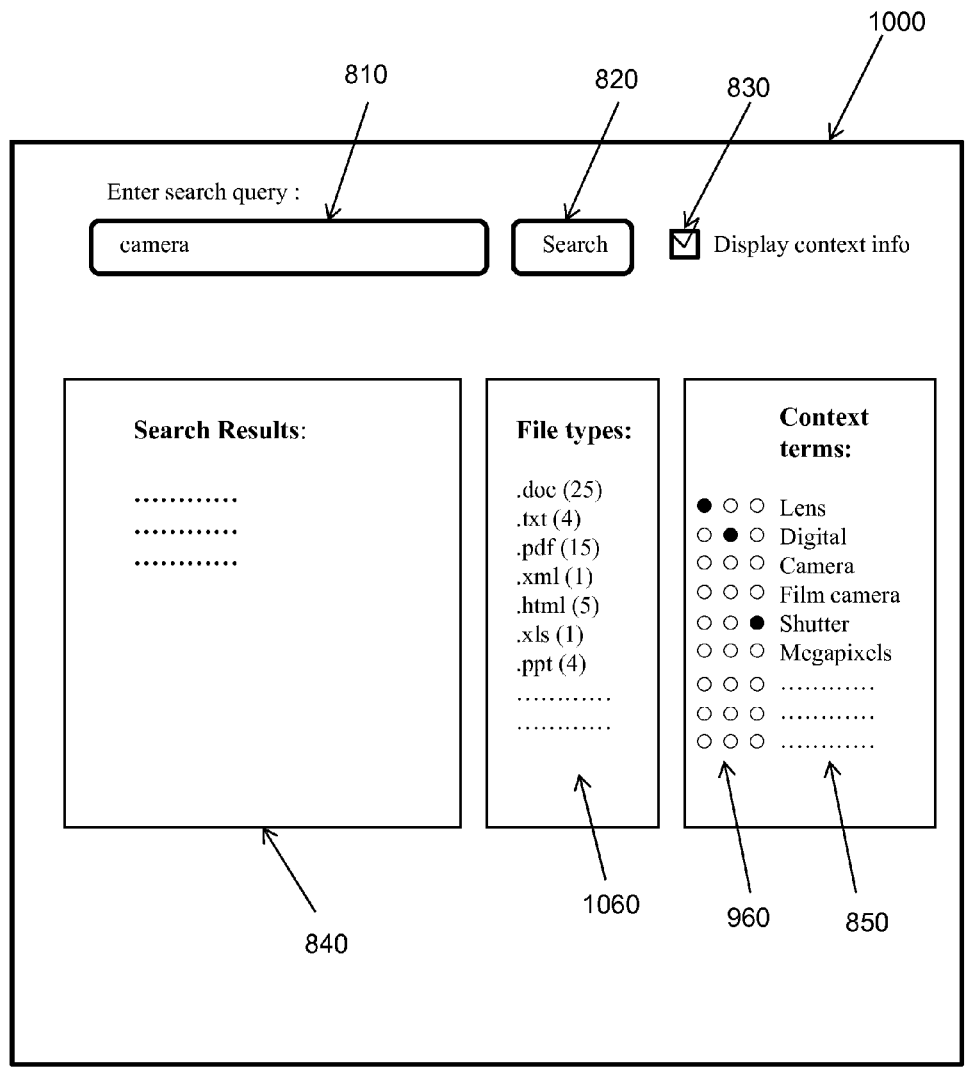
FIG. 10 is an exemplar user interface providing the user with file types as document property and other context terms as the potentially relevant context information.

FIG. 10 illustrates a user interface 1000 displaying a document property 1060 "file type" as context information in a search. The file types and the number of each type of files can be updated in real-time in response to the queried terms as each character is being entered in the search box 810. It should be noted that in the so-called "advanced search" in conventional search systems, document properties are provided as criteria for search operations, but they require manual selection of each property by the user. In contrast, the presently disclosed method can automatically present the applicable document properties and related values as search options to the user. The user does not have to manually specify which document properties and which values to use for the search. An advantage of the present invention is that it turns a writing process into a reading process, which is a lot easier and requires a lot less mental efforts on the user's side.

In the present invention, the multiple file properties as system-generated metadata such as file type, file location, etc, can be used alone, or in combination with other properties including the context term list described earlier. The user can select which type of the available context information to be displayed in the search system's user interface. When multiple properties are used in combination, the search system can use a method to dynamically update the context property lists as the user makes the choices, effectively narrowing down the search scope. For example, when the context term list is used in combination with the "file type", and when a particular file type is selected by the user, then the context term list may be immediately shortened to reflect those context terms that occur only in the selected file type or types, and vice versa. This can effectively guide the user to narrow down to where the needed information is located, and effectively reduce the potentially irrelevant documents to be retrieved, thus effectively reduce the time needed for the user to inspect the retrieved documents.

Furthermore, the number of documents or other searchable files related to each context item or search option can be dynamically displayed and updated as one or more such context items are selected. For example, referring to FIG. 10, when the user enters the search keyword of "camera", the system not only displays the semantic context terms related to "camera", but also other items of context information or search options such as file type, location in folders, creation/modification dates, file publishing date, and author, etc. A number or numeric value can be displayed next to each of such items, indicating the number of documents related to this particular context item. For example, if the search keyword is "camera", and there are a total of 55 documents in the search system that contain the word of "camera", and 25 of them have a file extension of ".doc", and 15 of them have a file extension of ".pdf", and etc., such numbers can be dynamically displayed next to the item name of "doc", "pdf" etc., as file type context item or search option. Also, when other context items are enabled, such as file locations in the form of folder names, and for example when 10 of the documents containing the keyword of "camera" reside in the folder named "My Documents", 20 of them reside in the folder named "Projects", etc., these numbers can also be displayed next to the context item name, and dynamically updated when other items are selected.

In environments other than the file system on a personal or company computer as exemplified above, other document properties specific to the environment can be used for providing dynamic context information. For example, file creation or publishing dates can be useful document properties for searches on the Internet.

The system and methods disclosed in the present invention can be applied to various environments where search for information is needed. The exemplar illustrations above with the personal computer environment are only one of the many applications.

One especially useful application of the present invention is with patent search. Patent search is often a very difficult task. One of the reasons is that the keywords used in various patent documents are not well defined, or their definitions do not necessarily conform to the commonsense definitions. The same keyword can be used to indicate various subject matter or different subtopics of a subject matter. For example, a search in the USPTO for the keyword "information management" can retrieve more than 700,000 patents and published applications (as of September, 2010). Some of them refer to the digital binary information storage, while others refer to various other senses of the word "information", such as acoustic information, or text information, etc. It is usually a very time-consuming task to locate what the user is searching for.

The presently disclosed system and methods can provide an effective way to quickly locate the pertinent candidates. With the display of context information alongside the search, the user can easily know what are more likely to be related and what are less likely, and can select the context terms that are relevant to the intended search, or can quickly eliminate those that are not relevant to the intended search, without spending more time in reading the full abstract or summary.

Furthermore, when the user enables the multiple context information display, other query-dependent properties specific to the patent documents can also be displayed for selection. For example, with the search query string being "information management", in addition to the context term list as described above, other fields such as inventor or assignee name, place, date, etc., can also be automatically and dynamically displayed with the filtered contents that are applicable to the query only, and the list of items for selection can further be shortened when the user selects a value from one of the properties.

The presently disclosed system and methods can also be applied to many other environments without deviating from the spirit of the principles and the methods described above.

What is claimed is:

1. A computer-assisted method for assisting a user to search for documents or other file objects, comprising:
   receiving a query comprising a queried term from a user, wherein the queried term comprises a sequence of characters entered by the user;
   in response to each character being entered in the query, obtaining, by the computer system, a first search result comprising a plurality of documents and a first context term list comprising a first context term, wherein the first context term is selected from one or more of the plurality of documents, and displaying an interface object for the first context term to allow the user to indicate the degree of importance of the first context term to the query;
   displaying, by the computer system, the first search result and the first context term list in response to each character being entered in the query;
   allowing the user to select a first context term in the first context term list;
   obtaining and displaying, by the computer system, a second search result comprising a plurality of documents in a user interface in response to the selection of the first context term in the first context term list.

2. The computer-assisted method of claim 1, further comprising:
   obtaining, by the computer system, a second context term list comprising a second context term, wherein the second context term is selected from one or more of the plurality of documents in the second search result suggesting a topic in the one or more documents, and displaying the second context term list in a user interface;
   allowing the user to select a second context term in the second context term list; and
   obtaining and displaying, by the computer system, a third search result in response to the selection of the second context term in the second context term list.

3. The computer-assisted method of claim 1, wherein the second search result is in response to a computer-modified query based on the first context term selected by the user.

4. The computer-assisted method of claim 1, wherein the user is allowed to select multiple context terms in the first context term list wherein the second search result is obtained based on the multiple context terms selected by the user.

5. The computer-assisted method of claim 1, further comprising:

allowing the user to indicate the degree of relevance of the one or more context terms in the first context term list, wherein the second search result is obtained based on a combination of the one or more context terms according to the indicated relevance of the one or more context terms in the first context term list.

6. The computer-assisted method of claim 1, wherein at least one of the first context term list is pre-compiled and stored in association with the searchable term in a database.

7. The computer-assisted method of claim 1, wherein the step of obtaining a first context term list comprises:
   matching the queried term to a searchable term in the database, wherein the searchable term is stored in association with one or more context terms selected from the documents potentially relevant to the searchable term in a database; and
   retrieving the one or more context terms associated with the searchable term as the first context term list.

8. The computer-assisted method of claim 7, further comprising:
   identifying one or more topic terms in a document collection comprising a plurality of documents potentially relevant to the searchable term;
   calculating a document topic score for each of the one or more topic terms;
   selecting at least one of the one or more topic terms based on its document topic score; and
   storing the one of the one or more topic terms as a context term list in association with the searchable term in the database.

9. The computer-assisted method of claim 8, wherein the step of calculating the document topic score for one or more topic terms comprises:
   obtaining a first group of text units in the document collection, wherein the text unit comprises a plurality of words;
   tokenizing the first group of text units by the computer system to produce a plurality of tokens that include a jth token;
   assigning token types to the tokens in the first group of text units according to the grammatical roles of the tokens;
   assigning weighting coefficients to the tokens in the first group of text units according to the token types of the tokens;
   for each text unit in the first group that includes the jth token, adding a weighting coefficient to a parameter token_j_count;
   dividing a cumulative value of the parameter token_j_count obtained from the first group of text units by the total number of text units in the first group to produce an internal term prominence (ITP) value for the jth token;
   selecting one or more tokens from the plurality of tokens at least in part based on the ITP values of the respective tokens; and
   outputting the one or more topic terms as the topic terms from the document collection, the one or more topic terms comprising the selected one or more tokens.

10. The computer-assisted method of claim 8, wherein the document collection in which the one or more topic terms are identified at least partially overlap with the first search result or the second search result.

11. The computer-assisted method of claim 7, further comprising:
    identifying one or more topic terms in a plurality of documents comprising a first document potentially relevant to the searchable term;
    calculating a document topic score for each of the one or more topic terms;
    selecting at least one of the one or more topic terms based on its document topic score; and
    storing the one of the one or more topic terms as a context term list in association with the searchable term in the database.

12. The computer-assisted method of claim 11, wherein the step of identifying one or more topic terms in a first document comprises:
    obtaining a first group of text units in the first document, each of the text units in the first group comprises one or more words;
    tokenizing the first group of text units to produce a plurality of tokens that include a jth token;
    assigning token types to the tokens in the first group of text units according to the grammatical roles of the tokens;
    assigning weighting coefficients to the tokens in the first group of text units according to the token types of the tokens;
    for each text unit in the first group that includes the jth token, adding a weighting coefficient to a parameter token_j_count;
    dividing a cumulative value of the parameter token_j_count obtained from the first group of text units by the total number of text units in the first group to produce an internal term prominence (ITP) value for the jth token;
    calculating a term prominence value for the jth token using at least the ITP value of the jth token;
    selecting one or more tokens from the plurality of tokens at least in part based on the term prominence values of the respective tokens; and
    outputting one or more topic terms comprising the selected one or more tokens as the topic terms from the first document.

13. The computer-assisted method of claim 12, wherein the first document in which the one or more topic terms are identified includes a combination of at least a portion of the first search result or the second search result.

14. The computer-assisted method of claim 1, further comprising:
    obtaining document properties or property values related to the documents in the first search result by the computer system;
    displaying, in the user interface, the document properties or property values related to the documents in the first search result in response to each character being entered in the query; and
    allowing the user to select at least one of the document properties or property values, wherein the second search result is obtained based on the query, the first context term, and the at least one of the document properties or property values selected by the user.

15. The computer-assisted method of claim 14, wherein the document properties comprise file types, file locations, file creation date, file publishing date, author, or other metadata of the documents, wherein the property values comprises a specific file type, a specific date, a specific author name, or other specific information under a corresponding document property; wherein the number of documents having each document property or property values is dynamically displayed in the user interface in association with the respective document property or property value.

16. A computer-assisted method for automating search options for finding documents or other file objects on a computing device, comprising:

receiving a query comprising a queried term from a user wherein the queried term comprises a sequence of characters entered by the user;

in response to each character being entered in the query, obtaining, by the computer system, a first search result comprising a plurality of documents, and a first context term list comprising a first context term, wherein the first context term is selected from one or more of the plurality of documents and based on an importance measure of the term inside the documents and an importance measure of the term in a different document, and optionally, obtaining one or more document properties or property values related to the one or more documents;

displaying, in a user interface, by the computer system, the context term list and the optional document properties or property values related to the documents in the first search result in response to each character being entered in the query;

allowing the user to select at least one of the document properties or property values; and obtaining, by the computer system, without the user entering a new query, a second search result comprising one or more documents, wherein each of the one or more documents has at least one of the document properties or property values selected by the user.

17. The computer-assisted method of claim 16, wherein the document properties include file types, file locations, file creation date, file publishing date, author, or other metadata of the documents, wherein the property values comprises a specific file type, a specific date, a specific author name, or other specific information under a corresponding document property; wherein the number of documents having each document property is dynamically displayed in the user interface in association with the respective document property or property value.

18. A computer-assisted method for automating search options for finding documents or other file objects on a computing device, comprising:

receiving a query comprising a queried term from a user wherein the queried term comprises a sequence of characters entered by the user;

in response to each character being entered in the query, obtaining, by the computer system, a first search result comprising a plurality of documents, and a first context term list comprising a first context term, wherein the first context term is selected from one or more of the plurality of documents based on the grammatical attribute of the term in the documents, displaying an interface object for the first context term to allow the user to indicate the degree of importance of the first context term to the query, and optionally, obtaining one or more document properties or property values related to the one or more documents;

displaying, in a user interface, by the computer system, the context term list and the optional document properties or property values related to the documents in the first search result in response to each character being entered in the query;

allowing the user to select at least one of the document properties or property values; and obtaining, by the computer system, without the user entering a new query, a second search result comprising one or more documents, wherein each of the one or more documents has at least one of the document properties or property values selected by the user.

19. The computer-assisted method of claim 18, wherein the document properties include file types, file locations, file creation date, file publishing date, author, or other metadata of the documents, wherein the property values comprises a specific file type, a specific date, a specific author name, or other specific information under a corresponding document property; wherein the number of documents having each document property is dynamically displayed in the user interface in association with the respective document property or property value.

\* \* \* \* \*